US010377247B2

(12) United States Patent
Gonzales et al.

(10) Patent No.: US 10,377,247 B2
(45) Date of Patent: Aug. 13, 2019

(54) HIGH VOLTAGE BATTERY CONTACTOR ARRANGEMENT FOR DC FAST CHARGING

(71) Applicant: Ford Global Technologies, LLC, Dearborn, MI (US)

(72) Inventors: Philip Michael Gonzales, Dearborn, MI (US); Vineeth Seshadri Kallur, Novi, MI (US); Masahiro Kimoto, Plymouth, MI (US); Wesley Edward Burkman, Dearborn, MI (US); Benjamin A. Tabatowski-Bush, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 671 days.

(21) Appl. No.: 14/810,006

(22) Filed: Jul. 27, 2015

(65) Prior Publication Data

US 2017/0028857 A1 Feb. 2, 2017

(51) Int. Cl.
*H02J 7/00* (2006.01)
*G01R 21/00* (2006.01)
*G01R 21/14* (2006.01)
*B60L 11/18* (2006.01)
*H02J 1/00* (2006.01)
*B60L 53/00* (2019.01)

(52) U.S. Cl.
CPC .......... *B60L 11/1809* (2013.01); *B60L 53/00* (2019.02); *H02J 1/00* (2013.01); *H02J 7/0073* (2013.01); *H02J 7/0077* (2013.01); *H02J 2001/008* (2013.01)

(58) Field of Classification Search
CPC ..... Y02T 90/14; Y02T 90/128; Y02T 90/163; Y02T 10/7005; Y02T 10/7088; B60L 11/1809; H02J 1/00; H02J 7/0073; H02J 7/0077; H02J 2001/008; G01R 21/00; G01R 21/14
USPC .................................. 320/109; 324/426–434
See application file for complete search history.

(56) References Cited

U.S. PATENT DOCUMENTS

| 4,916,438 A * | 4/1990 | Collins ................. H02J 7/0047 324/430 |
| 8,643,335 B2 | 2/2014 | Arakawa et al. |
| 8,660,732 B2 | 2/2014 | Masuda |
| 2011/0084704 A1* | 4/2011 | Myoen ...................... B60L 3/12 324/538 |
| 2012/0105065 A1* | 5/2012 | Namou .............. G01R 31/3275 324/415 |
| 2013/0175990 A1 | 7/2013 | Jung et al. |

(Continued)

FOREIGN PATENT DOCUMENTS

WO WO 2013089516 A1 * 6/2013 ............ H01M 10/44

*Primary Examiner* — Richard Isla
*Assistant Examiner* — Mohammed J Sharief
(74) *Attorney, Agent, or Firm* — David B. Kelley; Brooks Kushman P.C.

(57) ABSTRACT

A charging system for a high voltage battery includes a pair of contactors each electrically connected to one of positive and negative terminals of the battery and configured to enable charging of the battery when closed; and a controller programmed to generate a notification indicating that one of the contactors is welded closed based on port voltage values achieved while issuing a predetermined sequence of open and close commands to the contactors after charge completion.

13 Claims, 4 Drawing Sheets

(56) References Cited

U.S. PATENT DOCUMENTS

| | | | |
|---|---|---|---|
| 2013/0179061 A1* | 7/2013 | Gadh | B60L 11/1842 |
| | | | 701/123 |
| 2014/0354054 A1* | 12/2014 | Katou | B60L 58/18 |
| | | | 307/43 |
| 2015/0015183 A1 | 1/2015 | Pursifull | |
| 2015/0097527 A1 | 4/2015 | DeDona et al. | |

* cited by examiner

HIGH VOLTAGE BATTERY CONTACTOR ARRANGEMENT FOR DC FAST CHARGING

TECHNICAL FIELD

The present disclosure relates to systems and methods for providing direct current (DC) fast charging to a high voltage (HV) battery.

BACKGROUND

A high voltage battery in an electrified vehicle may be recharged using either alternating current (AC) or DC charging. The vehicle may be connected to an AC power grid and receive electric energy via AC Level 1 or AC Level 2 charging using a 120-volt (V) or 240V connection, respectively. A connection to a DC charge-capable charging station may allow for recharging of the high voltage battery at various current rates, such as DC Level 1 200-450V/80 amperes (A), DC Level 2 200-450V/200 A, DC Level 3 200-450V/400 A, and so on. A DC charging session may, therefore, take less time to transfer the same amount of energy as compared with an AC charging session.

SUMMARY

A charging system for a high voltage battery includes a pair of contactors each electrically connected to one of positive and negative terminals of the battery and configured to enable charging of the battery when closed, and a controller programmed to generate a notification indicating that one of the contactors is welded closed based on port voltage values achieved while issuing a predetermined sequence of open and close commands to the contactors after charge completion.

A method for charging a high voltage battery includes commanding closed a pair of contactors each electrically connected to one of positive and negative terminals of the battery and arranged to enable charging of the battery, monitoring port voltage values between positive and negative nodes associated with the contactors while issuing a predetermined sequence of open and close commands to the contactors, and generating a notification indicating that one of the contactors is welded closed based on the port voltage values.

A charging system for a high voltage battery includes a pair of contactors each electrically connected to one of positive and negative terminals of the battery, and a controller programmed to generate a notification indicating that both contactors are welded closed based on a difference between port voltage values and pack voltage values achieved upon charge completion, and a port voltage value achieved in response to a command to open the contactors after charge completion.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
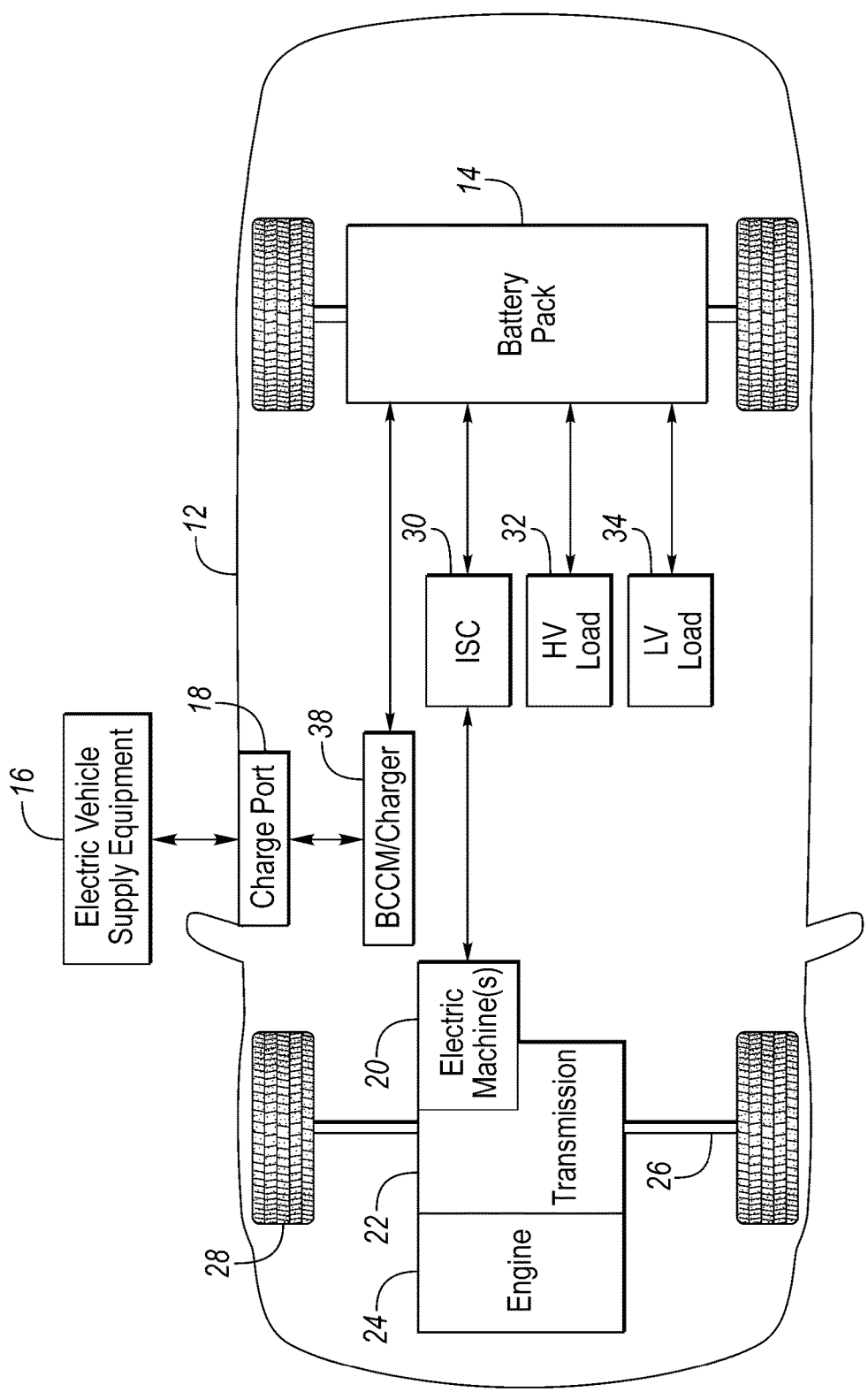
FIG. 1 is a block diagram of a plug-in hybrid electric vehicle (PHEV) illustrating a typical drivetrain and energy storage components.

FIG. 1 depicts a typical plug-in hybrid-electric vehicle (PHEV). A plug-in hybrid-electric vehicle 12, hereinafter vehicle 12, may comprise at least one traction battery or battery pack 14 configured to receive electric charge via a charging session at a charging station (not shown) connected to a power grid (not shown). The vehicle 12 may, for example, cooperate with electric vehicle supply equipment (EVSE) 16 of the charging station to coordinate the charge transfer from the power grid to the battery pack 14. The power grid may include a device that harnesses renewable energy, such as a photovoltaic (PV) solar panel, or a wind turbine (not shown).

The EVSE 16 may include circuitry and controls to regulate and manage the transfer of energy between the power grid and the vehicle 12. For example, the EVSE 16 may have a charge connector for plugging into a charge port 18 of the vehicle 12, such as via connector pins that mate with corresponding recesses of the charge port 18. The charge port 18 may be any type of port configured to transfer power from the EVSE 16 to the vehicle 12. As will be explained in further detail in reference to FIG. 2, a battery charger control module (BCCM) 38 in communication with the charge port 18 may control the charge flow between the charge port 18 and the battery pack 14. Similarly, the EVSE 16 may include a control module (not shown) that conditions the power supplied from the EVSE 16 to provide the proper voltage and current levels to the vehicle 12.

The EVSE 16 may be designed to provide single- or three-phase AC or DC power to the vehicle 12. Differences in the charge connector and charging protocol may exist between an AC-, a DC-, and an AC/DC-capable EVSE. The EVSE 16 may further be capable of providing different levels of AC and DC voltage including, but not limited to, Level 1 120 volt (V) AC charging, Level 2 240V AC charging, Level 1 200-450V and 80 amperes (A) DC charging, Level 2 200-450V and up to 200 A DC charging, Level 3 200-450V and up to 400 A DC charging, and so on.

Time required to receive a given amount of electric charge may vary among the different charging methods. It may take several hours to charge a given battery pack using a single-phase AC charging session. The same amount of charge under similar conditions may be obtained in minutes using DC charging. The latter charging method is also referred to as DC fast charging.

In one example, both the charge port 18 and the EVSE 16 may be configured to comply with industry standards pertaining to electrified vehicle charging, such as, but not limited to, Society of Automotive Engineers (SAE) J1772, J1773, J2954, International Organization for Standardization (ISO) 15118-1, 15118-2, 15118-3, the German DIN Specification 70121, and so on. In one example, the recesses of the charge port 18 may comprise 7 terminals (indicated generally with a double-headed arrow), with terminals 1 and 2 designated for Level 1 and 2 AC power exchange, terminal 3 designated for a ground connection, terminals 4 and 5 designated for control signals, and terminals 6 and 7 designated for DC charging, such as, but not limited to, Levels 1, 2, or 3 DC charging.

By way of an example, terminal 4 can be used to conduct control pilot signals, and terminal 5 can be used to conduct proximity detection signals. A proximity signal may be a signal indicative of a state of engagement between the charge port 18 and the connector of the EVSE 16. A control pilot signal, e.g., a low-voltage pulse-width modulation (PWM) signal, may be used to control the charging process.

The vehicle 12 may further comprise one or more electric machines 20 mechanically connected to a hybrid transmission 22. The electric machines 20 may be capable of operating as a motor or a generator. In addition, the hybrid transmission 22 is mechanically connected to an engine 24. The hybrid transmission 22 is also mechanically connected to a drive shaft 26 that is mechanically connected to the wheels 28.

The electric machines 20 can provide propulsion and deceleration capability when the engine 24 is turned on or off using energy stored in the battery pack 14. The electric machines 20 also act as generators and can provide fuel economy benefits by recovering energy that would normally be lost as heat in the friction braking system. The electric machines 20 may also provide reduced pollutant emissions since the vehicle 12 may be operated in electric mode under certain conditions.

The battery pack 14 typically provides a high voltage DC output. The battery pack 14 may be electrically connected to an inverter system control (ISC) 30. The ISC 30 is electrically connected to the electric machines 20 and provides the ability to bi-directionally transfer energy between the battery pack 14 and the electric machines 20. In a motor mode, the ISC 30 may convert the DC output provided by the battery pack 14 to a three-phase alternating current as may be required for proper functionality of the electric machines 20. In a regenerative mode, the ISC 30 may convert the three-phase AC output from the electric machines 20 acting as generators to the DC voltage required by the battery pack 14. While FIG. 1 depicts a typical plug-in hybrid electric vehicle, the description herein is equally applicable to a pure electric vehicle. For a pure electric vehicle, e.g., battery electric vehicle (BEV), the hybrid transmission 22 may be a gear box connected to the electric machine 20 and the engine 24 may not be present.

In addition to providing energy for propulsion, the battery pack 14 may provide energy for other vehicle electrical systems. For example, the battery pack 14 may transfer energy to high-voltage loads 32, such as compressors and electric heaters. In another example, the battery pack 14 may provide energy to low-voltage loads 34, such as an auxiliary 12V battery. In such an example the vehicle 12 may include a DC/DC converter module (not shown) that converts the high voltage DC output of the battery pack 14 to a low voltage DC supply that is compatible with the low-voltage loads 34. The various components discussed may have one or more associated controllers to control and monitor the operation of the components. The controllers may communicate via a serial bus (e.g., Controller Area Network (CAN)) or via discrete conductors.

Figure 2:
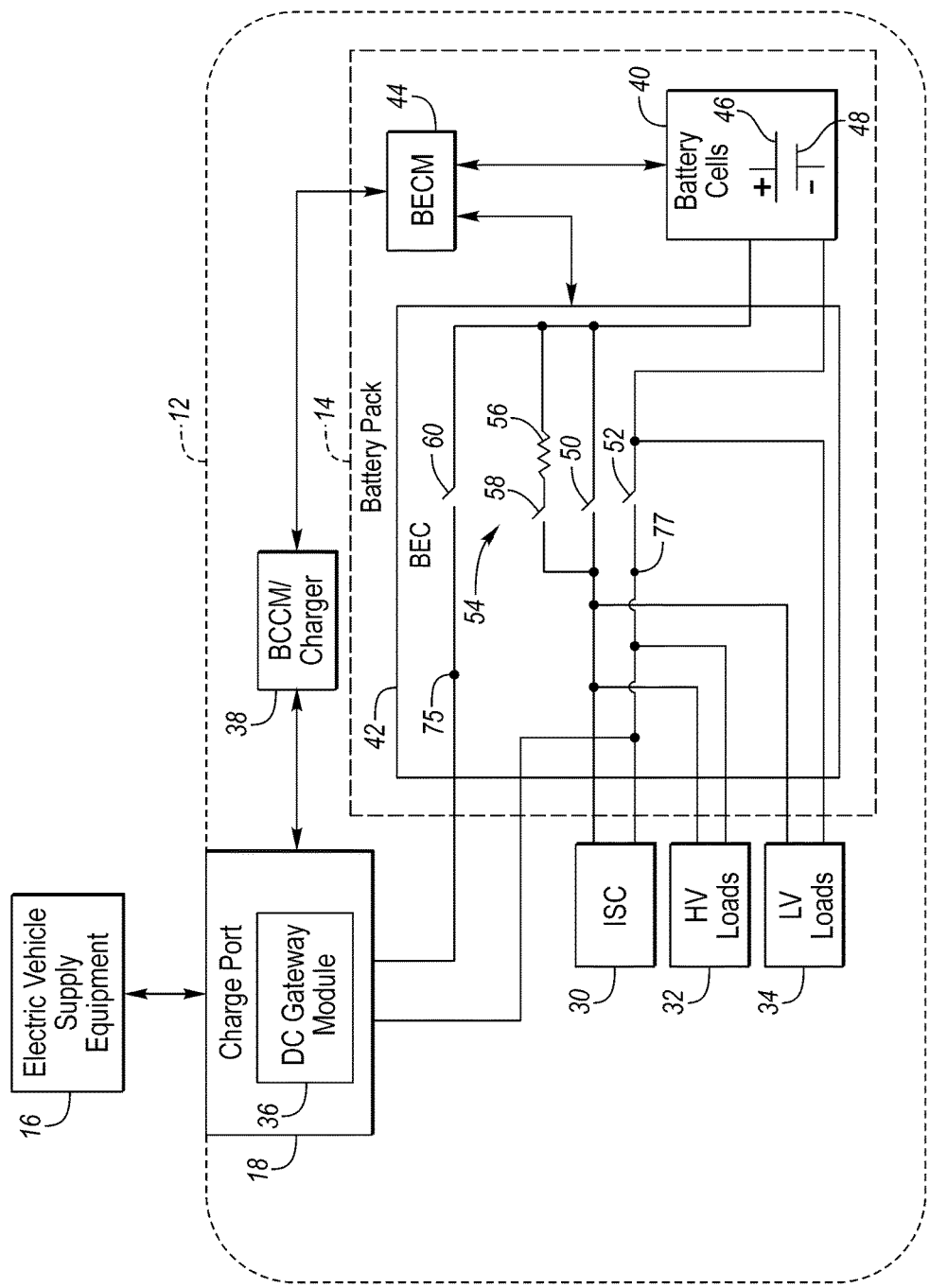
FIG. 2 is a block diagram illustrating a contactor arrangement for DC fast charging.

In reference to FIG. 2, a contactor arrangement for DC fast charging of a high-voltage battery is shown. The charge port 18 may comprise a DC gateway module (DCGM) 36 in communication with the EVSE 16. The DCGM 36 may be configured to receive a signal indicative of a request to transfer electric energy between the EVSE 16 and the battery pack 14 via an AC or a DC charging session.

The DCGM 36 may also be in communication with the BCCM 38. The DCGM 36 may send a request to the BCCM 38 to initiate a charging session. For example, the DCGM 36 may send to the BCCM 38 via a control pilot signal terminal a signal indicative of a specific charging session type being requested by the EVSE 16. In one example, the BCCM 38 may be configured to interpret a particular duty cycle of the PWM signal, e.g., 10%, as being indicative of a request to initiate a DC fast charging session.

The battery pack 14 may comprise one or more battery cells 40, a bussed electric center (BEC) 42, and a battery energy control module (BECM) 44. The battery cells 40, e.g., electrochemical cells, may have any suitable configuration and serve to receive and store electric energy for use in operation of the vehicle 12. Each cell may provide a same or different nominal level of voltage. The battery cells 40 may be arranged into one or more arrays, sections, or modules further connected in series or in parallel.

The battery cells 40 may be electrically connected to the BEC 42 via a positive terminal 46 and a negative terminal 48. The terminals 46, 48 may be of electrically conductive material, such as metal, and may have any suitable configuration. As will be described below in further detail, the BEC 42 may include a plurality of connectors and switches allowing the supply and withdrawal of electric energy to and from the battery cells 40 via a connection with the positive and negative terminals 46, 48. While the battery pack 14 is described to include, for example, electrochemical battery cells, other types of energy storage device implementations, such as capacitors, are also contemplated.

The BECM 44 is connected with the BEC 42 and controls the energy flow between the BEC 42 and the battery cells 40. For example, the BECM 44 may be configured to monitor and manage temperature and state of charge of each of the battery cells 40. In another example, the BECM 44 may command the BEC 42 to open or close a plurality of switches in response to temperature or state of charge in a given battery cell reaching a predetermined threshold. The BECM 44 may further be in communication with other vehicle controllers (not shown), such as an engine control module (ECM) and transmission control module (TCM), and may command the BEC 42 to open or close a plurality of switches in response to a predetermined signal from the other vehicle controllers.

The BECM 44 may also be in communication with the BCCM 38. For example, the BCCM 38 may send a signal to the BECM 44 indicative of a DC fast charging session request. The BECM 44 may then command the BEC 42 to open or close a plurality of switches allowing the transfer of electric energy between the EVSE 16 and the battery pack 14 via a DC fast charging session. As will be described in further detail in reference to FIG. 3, the BECM 44 may perform voltage matching prior to commanding the BEC 42 to open or close a plurality of switches allowing the transfer of electric energy.

The BEC 42 may comprise a positive main contactor 50 electrically connected to the positive terminal 46 of the battery cells 40 and a negative main contactor 52 electrically connected to the negative terminal 48 of the battery cells 40. In one example, closing the positive and negative main contactors 50, 52 allows the flow of electric energy to and from the battery cells 40. In such an example, the BECM 44 may command the BEC 42 to open or close the main contactors 50, 52 in response to receiving a signal from the BCCM 38 indicative of a request to initiate or terminate a charging session. In another example, the BECM 44 may command the BEC 42 to open or close the main contactors 50, 52 in response to receiving a signal from another vehicle controller, e.g., ECM, TCM, etc., indicative of a request to initiate or terminate transfer of electric energy to and from the battery pack 14.

The BEC 42 may further comprise a pre-charge circuit 54 configured to control an energizing process of the positive terminal 46. In one example, the pre-charge circuit 54 may include a pre-charge resistor 56 connected in series with a pre-charge contactor 58. The pre-charge circuit 54 may be electrically connected in parallel with the positive main contactor 50. When the pre-charge contactor 58 is closed the positive main contactor 50 may be open and the negative main contactor 52 may be closed allowing the electric energy to flow through the pre-charge circuit 54 and control an energizing process of the positive terminal 46.

In one example, the BECM 44 may command BEC 42 to close the positive main contactor 50 and open the pre-charge contactor 58 in response to detecting that voltage level across the positive and negative terminals 46, 48 reached a predetermined threshold. The transfer of electric energy to and from the battery pack 14 may then continue via the positive and negative main contactors 50, 52. For example, the BEC 42 may support electric energy transfer between the battery pack 14 and the ISC 30 during either a motor or a generator mode via a direct connection to conductors of the positive and negative main contactors 50, 52.

In another example, the BECM 44 may enable energy transfer to the high-voltage loads 32, such as compressors and electric heaters, via a direct connection to the positive and negative main contactors 50, 52. In still another example, the BECM 44 may command energy transfer to the low-voltage loads 34, such as an auxiliary 12V battery, via a DC/DC converter (not shown) connected to the positive and negative main contactors 50, 52.

For simplicity and clarity AC charging session connections between the charge port 18 and the battery pack 14 have been omitted. In one example, the main contactors 50, 52 in combination with the pre-charge circuit 54 may be used to transfer AC energy between the EVSE 16 and the battery pack 14. For example, the BECM 44 may be configured to command the opening and closing of the main contactors 50, 52 in response to receiving a signal indicative of a request to initiate an AC charging session.

The BEC 42 may further comprise a DC fast charge contactor 60 electrically connected to the positive terminal 46. The BEC 42 may close the negative main contactor 52 and close the DC fast charge contactor 60 in response to a signal indicative of a request for a DC fast charging session. For example, the BECM 44 may command the BEC 42 to close the negative main contactor 52 and to close the DC fast charge contactor 60 in response to receiving a signal from the BCCM 38 indicative of a request for a DC fast charging session. The BECM 44 may selectively command the BEC 42 to open the negative main contactor 52 and to open the DC fast charge contactor 60 in response to receiving a notification of a DC fast charging session completion. As will be described in reference to FIGS. 3B and 4, the BECM 44 may be further configured to command the BEC 42 to selectively open and close the negative main contactor 52, the DC fast charge contactor 60, and other switches, based on a port voltage $V_{port}$, e.g., voltage measured at a positive node 75 and a negative node 77.

Figures 3A, 3B:
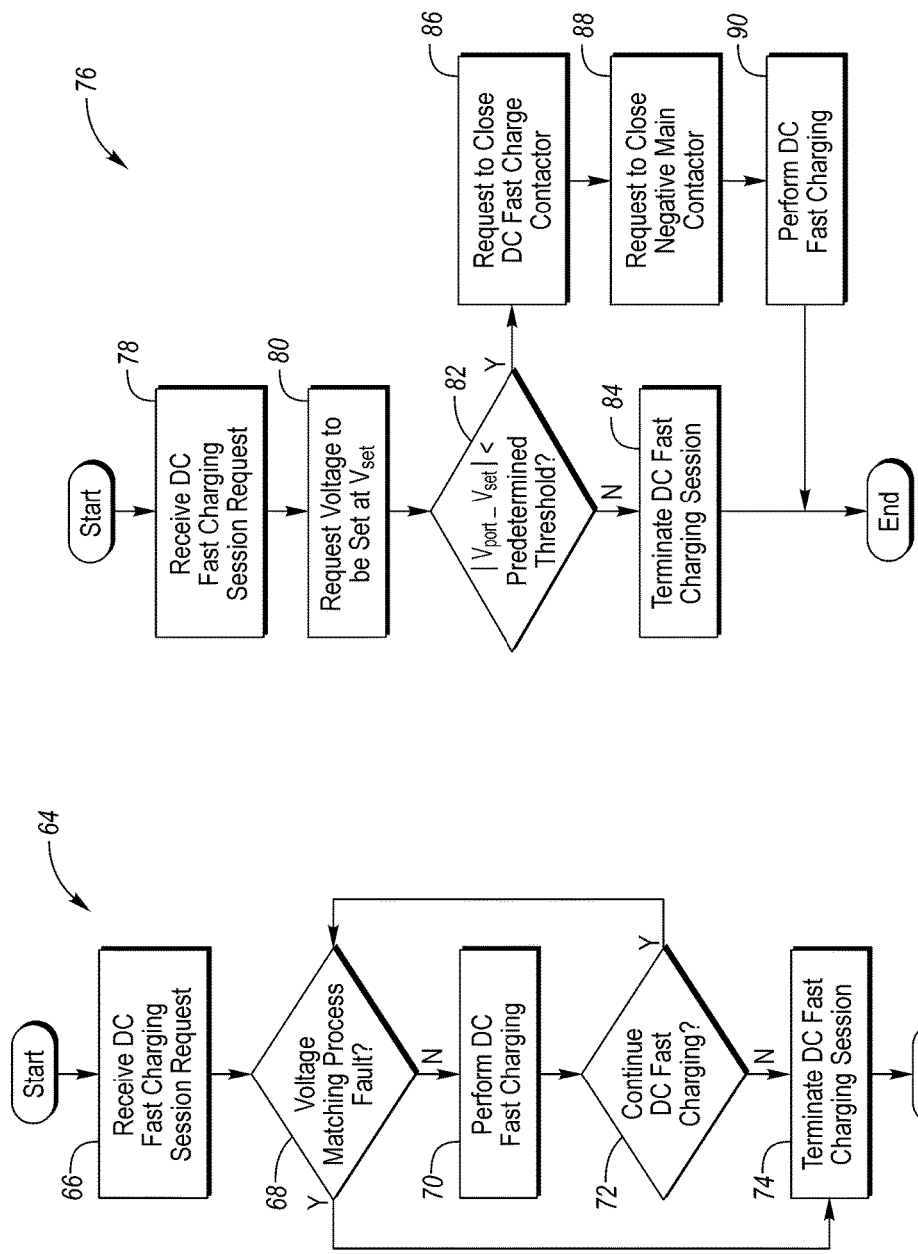
FIG. 3A is a flowchart illustrating an algorithm for providing DC fast charging to a HV battery.
FIG. 3B is a flowchart illustrating an algorithm for performing voltage matching during DC fast charging.

In reference to FIG. 3A, a control strategy 64 for charging an HV battery via DC fast charging is shown. The control strategy 64 may start at block 66 where the BECM 44 receives a signal indicative of a request to initiate a DC fast charging session from the BCCM 38. For example, the BCCM 38 may be configured to interpret a particular duty cycle of the DCGM PWM signal, e.g., 10%, as being indicative of a request to initiate a DC fast charging session, and to relay the request to the BECM 44.

As will be described in further detail in reference to FIG. 3B, the BECM 44 determines at block 68 whether a voltage matching fault is present. For example, the BECM 44 may determine that a voltage matching fault exists in response to determining that difference between an EVSE output voltage and a battery pack voltage is greater than a predetermined value. The BECM 44 may then terminate the DC fast charging session at block 74.

At block 70 the BECM 44 permits DC fast charge transfer between the EVSE 16 and the battery pack 14 in response to determining that the voltage matching process has been completed without faults. For example, the BECM 44 may command the BEC 42 to close the negative main contactor 52 and to close the DC fast charge contactor 60 allowing energy flow to the battery pack 14.

At block 72 the BECM 44 determines whether the DC fast charging session should be continued. For example, the BECM 44 may determine whether there has been a stop charge request, e.g., a manual stop request by a user, an automatic stop request by the EVSE 16, and so on. The control strategy 64 may return to block 68 where the BECM 44 determines whether a voltage matching process fault is present in response to determining that the DC fast charging session should be continued, e.g., there has not been a stop charge request.

At block 74 the BECM 44 terminates the DC fast charging session in response to determining at block 72 that the DC fast charging session should not be continued. For example, the BECM 44 may determine that a stop charge request, such as a manual or an automatic stop request, has been received. At this point the control strategy 64 may end. In some embodiments the control strategy 64 described in FIG. 3A may be repeated in response to receiving a signal indicative of a request to initiate a DC fast charging session or another request.

In reference to FIG. 3B, a control strategy 76 for performing voltage matching is shown. The control strategy may begin at block 78 where the BECM 44 receives a signal indicative of a request to initiate a DC fast charging session. At block 80 the BECM 44 requests the EVSE 16 to set output voltage to a predetermined voltage $V_{set}$. In one example, the BECM 44 may request the EVSE 16 to set the output voltage level approximately equal to the voltage level of the battery pack 14, hereinafter battery pack voltage $V_{pack}$, e.g., 400V. The BECM 44 may be configured to receive battery pack voltage $V_{pack}$ from a sensor (not shown) connected to the battery cells 40.

The BECM 44 determines at block 82 whether an absolute value of a difference between port voltage $V_{port}$ and a predetermined voltage $V_{set}$ is less than a predetermined value. In one example, the BECM 44 may be configured to determine port voltage $V_{port}$ by measuring voltage between the positive node 75 and the negative node 77. The BECM 44 terminates the DC fast charging session at block 84 in response to determining that the absolute value of the difference between port voltage $V_{port}$ and a predetermined voltage $V_{set}$ is greater than a predetermined value, e.g., 20V. In one example, in response to determining that the absolute value of the difference between port voltage $V_{port}$ and a predetermined voltage $V_{set}$ is greater than a predetermined value at block 82 and prior to terminating the DC fast charging session at block 84, the BECM 44 may use a debouncing timer. In such an example, the BECM 44 after a predetermined period may repeat at block 82 the determining whether an absolute value of a difference between port voltage $V_{port}$ and a predetermined voltage $V_{set}$ is less than a predetermined value, prior to terminating the DC fast charging session.

At blocks 86 and 88 the BECM 44 sends a request to the BEC 42 to close the DC fast charge contactor 60 and the negative main contactor 52, respectively, in response to determining at block 82 that the absolute value of the difference between port voltage $V_{port}$ and a predetermined voltage $V_{set}$ is less than a predetermined value. While blocks 86 and 88 show that the negative main contactor 52 is closed after the DC fast charge contactor 60, the sequence in which the DC fast charge contactor 60 and the negative main contactor 52 are closed may vary based on a given diagnostic strategy adopted by the BECM 44. The BECM 44 at block 90 performs DC fast charging. At this point the control strategy 76 may end. In some embodiments the control strategy 76 described in FIG. 3B may be repeated in response to receiving a signal indicative of a request to initiate a DC fast charging session or another request.

Figure 4:
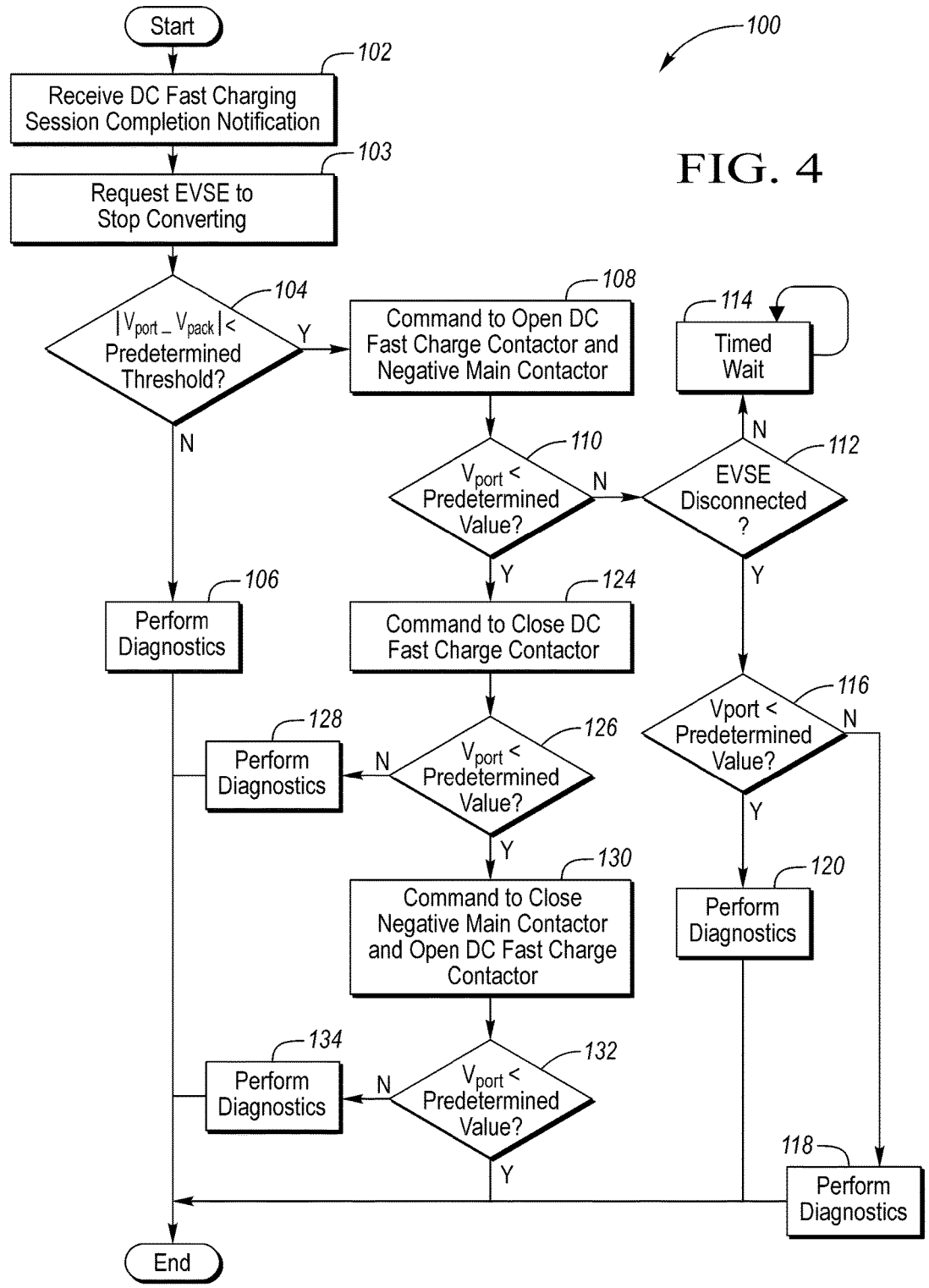
FIG. 4 is a flowchart illustrating an algorithm for performing DC fast charge contactor fault detection.

In reference to FIG. 4, a control strategy 100 for detecting a DC fast charging contactor fault is shown. The control strategy 100 may begin at block 102 where the BECM 44 receives a signal indicating that a DC fast charging session is complete, e.g., receives a notification of charge session completion. At block 103 the BECM 44 requests the EVSE 16 to stop converting power. For example, the BECM 44 may send a signal to the EVSE 16 via the BCCM 38 and the DCGM 36 indicative of a request to stop converting power.

At block 104 the BECM 44 determines whether an absolute value of a difference between port voltage $V_{port}$ and battery pack voltage $V_{pack}$ is less than a predetermined value. For example, the BECM 44 may be configured to receive a port voltage value as a voltage level between the positive node 75 and the negative node 77 and configured to receive battery pack voltage $V_{pack}$ as a voltage level of the battery cells 40. The BECM 44 performs diagnostics at block 106 in response to determining that the absolute value of the difference between port voltage $V_{port}$ and battery pack voltage $V_{pack}$ is greater than a predetermined value. In one example, the BECM 44 may report that the absolute value of the difference between port voltage $V_{port}$ and battery pack voltage $V_{pack}$ is greater than a predetermined value, e.g., 20V, and may set a diagnostic trouble code (DTC).

The BECM 44 commands the BEC 42 at block 108 to open both the DC fast charge contactor 60 and the negative main contactor 52 in response to determining at block 104 that the absolute value of the difference between port voltage $V_{port}$ and battery pack voltage $V_{pack}$ is less than a predetermined value. The BECM 44 then determines at block 110 whether port voltage $V_{port}$ is less than a predetermined value. For example, the BECM 44 determines whether port voltage $V_{port}$ is less than 50V in response to the command to open both the DC fast charge contactor 60 and the negative main contactor 52.

The BECM 44 determines at block 112 whether the EVSE 16 has been disconnected from the charge port 18, i.e., a state of the EVSE 16, in response to determining at block 110 that port voltage $V_{port}$ is greater than a predetermined value, e.g., 50V. For example, the BECM 44 may determine whether the charge connector of the EVSE 16 has been unplugged from the corresponding recesses of the charge port 18. If the BECM 44 determines that the EVSE 16 has not been disconnected, the BECM 44 at block 114 waits a predetermined period for the EVSE 16 to be disconnected. In one example, the BECM 44 may perform diagnostics if the EVSE 16 has not been disconnected after a predetermined period. The control strategy 100 may then end.

The BECM 44 determines at block 116 whether port voltage $V_{port}$ is less than a predetermined value in response to determining at block 112 that the EVSE 16 has been disconnected. For example, the BECM 44 determines whether port voltage $V_{port}$ is less than 50V in response to determining that the EVSE 16 has been disconnected. At block 118 the BECM 44 performs diagnostics in response to determining that port voltage $V_{port}$ is greater than a predetermined value. In one example, the BECM 44 may determine that the DC fast charge contactor 60 and the negative main contactor 52 have a fault, e.g., a weld fault. The control strategy 100 may then end.

At block 120 the BECM 44 performs diagnostics in response to determining that port voltage $V_{port}$ is less than a predetermined value after the EVSE 16 has been disconnected. In one example, the BECM 44 may determine that the EVSE 16 continued to convert power despite the BECM 44 request to stop converting. The control strategy 100 may then end.

At block 124 the BECM 44, in response to determining that port voltage $V_{port}$ is less than a predetermined value, commands BEC 42 to close the DC fast charge contactor 60 leaving the negative main contactor 52 open. The BECM 44 determines at block 126 whether port voltage $V_{port}$ is less than a predetermined value, e.g., 50V, in response to a command to close the DC fast charge contactor 60, leaving the main negative contactor 52 open. The BECM 44 performs diagnostics at block 128 in response to determining that port voltage $V_{port}$ is greater than a predetermined value. For example, the BECM 44 may determine that the negative main contactor 52 has a weld fault or another fault type. The control strategy 100 may then end.

At block 130 the BECM 44 commands the BEC 42 to close the negative main contactor 52 and to open the DC fast charge contactor 60 in response to determining at block 126 that port voltage $V_{port}$ is less than a predetermined value. At block 132 the BECM 44 determines whether port voltage $V_{port}$ is less than a predetermined value. The BECM 44 may exit the control strategy 100 in response to determining that port voltage $V_{port}$ is less than a predetermined value.

The BECM 44 performs diagnostics at block 134 in response to determining that port voltage $V_{port}$ is greater than a predetermined value, e.g., 50V. For example, the BECM 44 may determine that the DC fast charge contactor 60 has a weld fault or another type of fault and may then exit the control strategy 100. At this point the control strategy 100 may end. In some embodiments, the control strategy 100 described in FIG. 4 may be repeated in response to receiving a signal indicating that the DC fast charging session has been completed or another signal.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system, comprising:
    two contactors each connected to a different one of opposing battery terminals, wherein closing both of the contactors enables charging of the battery; and
    a controller programmed to generate a notification that both contactors are welded closed responsive to, upon charge completion, both a difference between a port voltage across contactor nodes and a battery voltage, prior to open command, being less than a first threshold and the port voltage, after the command, being greater than a second threshold.

2. The system of claim 1, wherein the controller is further programmed to generate the notification that both of the contactors are welded closed based on a state of electric vehicle supply equipment (EVSE).

3. The system of claim 1, wherein the controller is further programmed to generate the notification that both of the contactors are welded closed based on the port voltage achieved responsive to electric vehicle supply equipment (EVSE) being disconnected.

4. The system of claim 1, wherein the controller is further programmed to generate the notification indicating that at least one of the contactors is welded closed based on a difference between the port voltage and the pack voltage, and the port voltage achieved responsive to a command to open the contactors.

5. A method for charging a traction battery comprising:
    commanding to close first and second contactors, the first contactor being electrically connected to a positive terminal of the battery, the second contactor being electrically connected to a negative terminal of the battery, and the first and second contactors being arranged to enable charging of the battery;
    monitoring a port voltage across a positive node of the first contactor and a negative node of the second contactor; and
    generating a notification indicating that one of the contactors is welded closed responsive to, upon charge completion, both a difference between the port voltage and the battery voltage prior to a command to open both of the contactors, being less than a first threshold and the port voltage, after the command, being less than a second threshold, wherein the second threshold is greater than the first threshold.

6. The method of claim 5, further comprising generating a notification that both of the contactors are welded closed responsive to, upon charge completion, both the difference, prior to the command, being less than the first threshold and the port voltage, after the command, being greater than the second threshold.

7. The method of claim 6, wherein the generating of the notification that both of the contactors are welded closed is further based on a state of electric vehicle supply equipment (EVSE).

8. The method of claim 6, wherein the generating of the notification that both of the contactors are welded closed is further based on the port voltage achieved responsive to electric vehicle supply equipment (EVSE) being disconnected.

9. The method of claim 5, wherein the generating of the notification is further based on the port voltage, responsive to a command to close one of the contactors, being greater than the second threshold.

10. A charging system for a traction battery comprising:
    first and second contactors, the first contactor being electrically connected to a positive terminal of the battery and the second contactor being electrically connected to a negative terminal of the battery; and
    a controller programmed to generate a notification indicating that both contactors are welded closed responsive to, upon charge completion, both a difference between a port voltage across nodes of the contactors and a battery voltage, prior to a command to open of the both contactors, being less than a first threshold and the port voltage, detected after the command to open both of the contactors, being greater than a second threshold.

11. The charging system of claim 10, wherein the controller is further programmed to generate the notification based on a state of electric vehicle supply equipment (EVSE).

12. The charging system of claim 10, wherein the controller is further programmed to generate the notification responsive to the port voltage, when electric vehicle supply equipment (EVSE) is disconnected, being greater than the second threshold.

13. The charging system of claim 10, wherein the controller is further programmed to generate a notification indicating that one of the contactors is welded closed responsive to, upon charge completion, both the difference, prior to the command, being less than the first threshold and the port voltage, after the command, being greater than the second threshold.

\* \* \* \* \*